United States Patent [19]
Sandmeier

[11] 3,739,069
[45] June 12, 1973

[54] FILM VIEWER
[76] Inventor: Arthur Sandmeier, 78 Chemin de la Caille, Neuchatel 2000, Switzerland
[22] Filed: Aug. 13, 1971
[21] Appl. No.: 171,533

[30] Foreign Application Priority Data
Aug. 24, 1970 Great Britain................ 40,700/70

[52] U.S. Cl.................. 35/9 E, 353/71, 353/77, 353/119
[51] Int. Cl. ............................................ G09b 3/06
[58] Field of Search.................... 35/9 R, 9 A, 9 E, 35/9 F; 352/72, 78; 353/26, 71, 74, 77, 79, 95, 119; 40/86 A, 95

[56] References Cited
UNITED STATES PATENTS
3,498,707 3/1970 Allen .................................. 353/26
3,281,199 10/1966 Kingston ............................. 352/72
3,447,869 6/1969 Szymber ............................. 353/71
3,120,708 2/1964 Silber ................................. 35/9 E Primary Examiner—Wm. H. Grieb
Attorney—Bauer & Amer

[57] ABSTRACT

A viewing machine for projecting an image from a strip of film or the like comprising a body having a screen and optical means for projecting the image on the screen. The strip is wound in cartridge at least in part about two spaced reels. The strip is exposed between the reels. Means are provided for mounting the reels on a pair of rotatable studs to maintain the exposed portion operatively related to the optics. The studs are manually movable to move the strip past the optical means to project selected portions of the strip on the screen.

12 Claims, 12 Drawing Figures

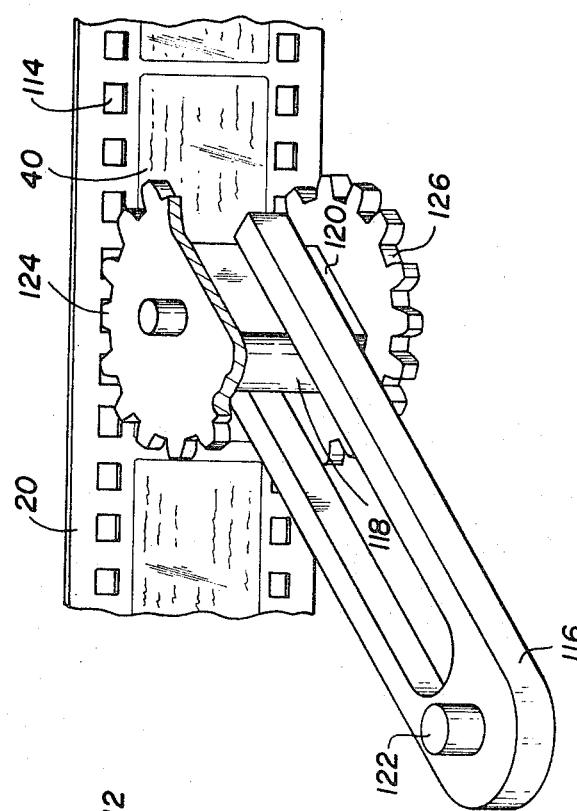
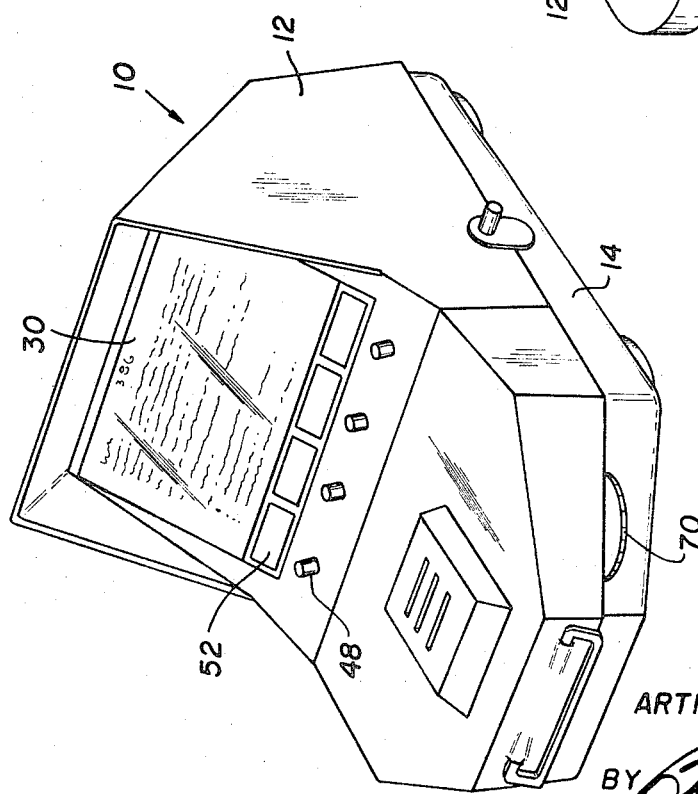
INVENTOR
ARTHUR SANDMEIER
BY
ATTORNEYS

INVENTOR
ARTHUR SANDMEIER

BY Bauer & Amer
ATTORNEYS

INVENTOR
ARTHUR SANDMEIER

FILM VIEWER

BACKGROUND OF THE INVENTION

The present invention relates to microfilm viewing devices in the operation of which prerecorded information on a film strip stored within the device is reproduced in such manner as to be easily viewable and in particular to teaching machines to effectively teach a pupil or user of the device the information which is reproduced.

In the following while reference is made to microfilm, it should be understood that the term includes any strip material on which information is stored and from which the information may be projected onto a screen. The term includes photographic paper, printed and similar items.

Recent technological improvements in data retrieval, information systems and particularly in self-automated teaching devices has created a pressing need for small manually operable units for individual use. The learning situation, specifically, is an individual process and thus small projectors capable of such use are a virtual necessity.

It is the object of the present invention to provide a viewing system for individual, manual operation wherein the film is capable of being selectively advanced or retracted at the manipulation of the user.

It is a particular object of the present invention to provide a viewing device particularly adaptable as a teaching machine wherein the student can control the advancement of each lesson, be provided with means for selecting responses to questions or other stimuli and wherein the user is furnished with a check or control advising him of the correctness of his response.

It is another object of this invention to provide a small, simple, inexpensive viewing and/or teaching machine.

According to one aspect of the invention, there is provided a device comprising a member for carrying stored information, means for reproducing a selected piece of stored information, including a question and answer based thereon, and means permitting the user to try to select the correct answer to the question.

Further features and advantages of the present invention will become apparent from the following description of an embodiment thereof.

According to the present invention a viewing machine is provided for projecting an image from a strip of film or the like comprising a body having a screen and optical means for projecting the image on the screen. The strip is wound in cartridge at least in part about two spaced reels. The strip is exposed between the reels. Means are provided for mounting the reels on a pair of rotatable studs to maintain the exposed portion operatively related to the optics. The studs are manually movable to move the strip past the optical means to project selected portions of the strip on the screen.

The film comprises a plurality of discrete frames in each of which visual information is stored, each frame being projected in its entirety on the screen. Preferably a mirror is provided which relfects the image from the optics to the screen. The mirror is removable so that the optics may project the image on a screen external of the viewer.

The studs are connected to external knob discs manipulated by the user. Means are also provided for cranking the film past the optics at a faster speed than can be accomplished by the discs. A motorized version is also provided.

The film comprises a plurality of discrete frames in each of which visual information is stored, each frame being projected in its entirety on the screen.

Full details of the present invention are given in the following disclosure and in the accompanying drawings, where:

FIG. 1 is a perspective view of the device according to the invention illustrating a typical reproduction of information on an integral screen of the device;

FIG. 12 is an enlarged perspective view of frame-indexing structure embodied by the device hereof.

DESCRIPTION OF THE INVENTION

Figure 2:
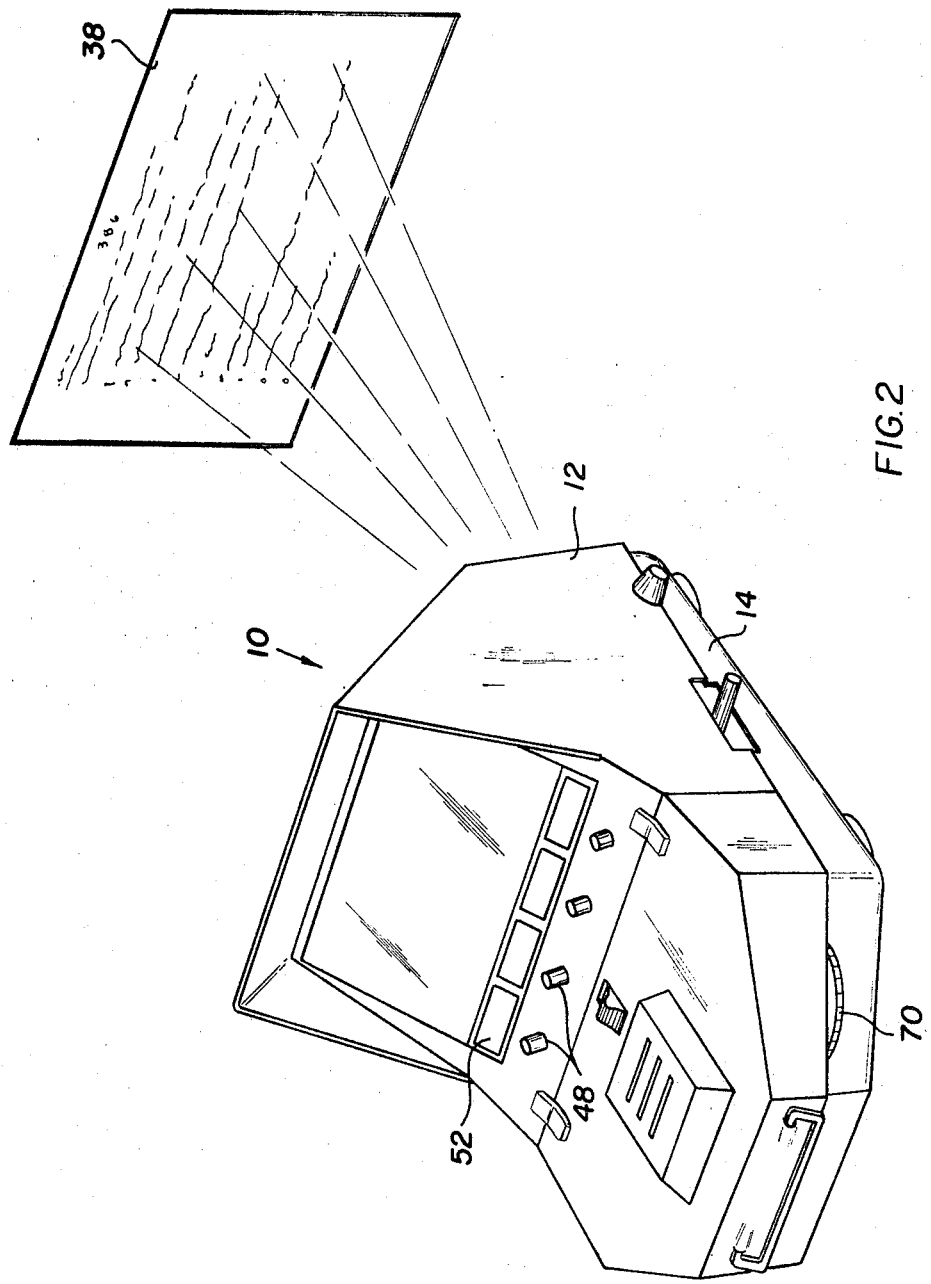
FIG. 2 is similarly a perspective view of the device, but illustrating the projection of the information on an external screen.
Figure 3:
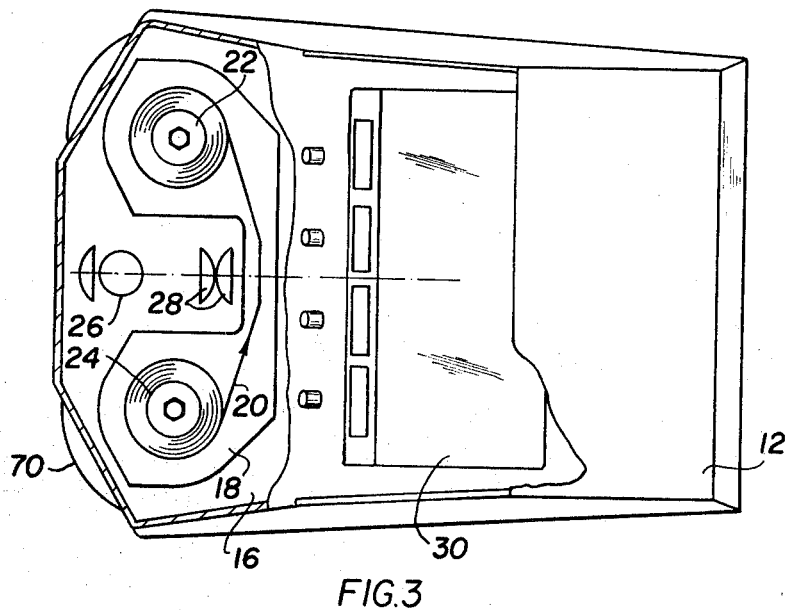
FIG. 3 is a plan view of the device illustrating internal structural features thereof.

The following description contains only those details needed for an understanding of the present invention. Should additional details be required reference can be made to the copending application of the inventor, Ser. No. 144,001 filed May 17, 1971.

Reference is now made to the drawings, and in particular to FIGS. 1–4, illustrating a teaching device generally designated 10. To minimize breakage during transit, and also to provide a compact construction, device 10 is constructed in essentially two parts, namely an upper housing 12 which fits over a base 14. The base 14, in turn, includes a chassis or support plate 16 (see in particular FIG. 4) which essentially supports all of the internal structural features of the device. Specifically, these internal structural features include a cassette or cartridge 18 containing microfilm strip 20 put up on reels 22 and 24. Appropriately located in an illuminating position behind the feed path of the microfilm 20 are means for projecting the information contained on the microfilm onto a viewing screen, said means including a light source 26 and focusing lens 28. The device also has provision for the reproduction of the projected information in an integral screen 30. Specifically, this is achieved by beaming the projected material onto the screen 30 using a reflecting mirror 32 pivotally mounted at its lower end 34 to the chassis 16.

Figure 4:
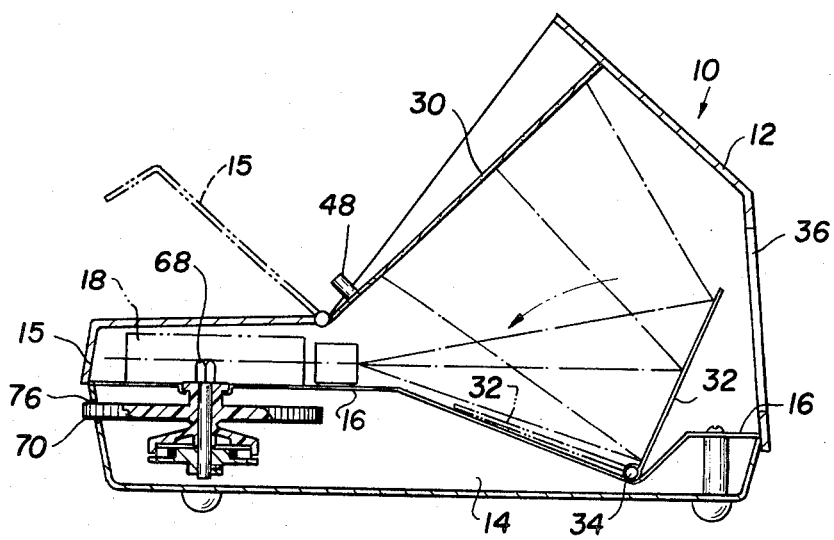
FIG. 4 is a side elevational view of the device illustrating further internal structural features thereof.

To project onto an external screen 38, as illustrated in FIG. 2, mirror 32 is moved forwardly to an out-ofthe-way position, as illustrated in phantom perspective in FIG. 4, so that projection can be made through an aperture 36 in the rear of the device 10 onto the external screen 38.

Figure 5:
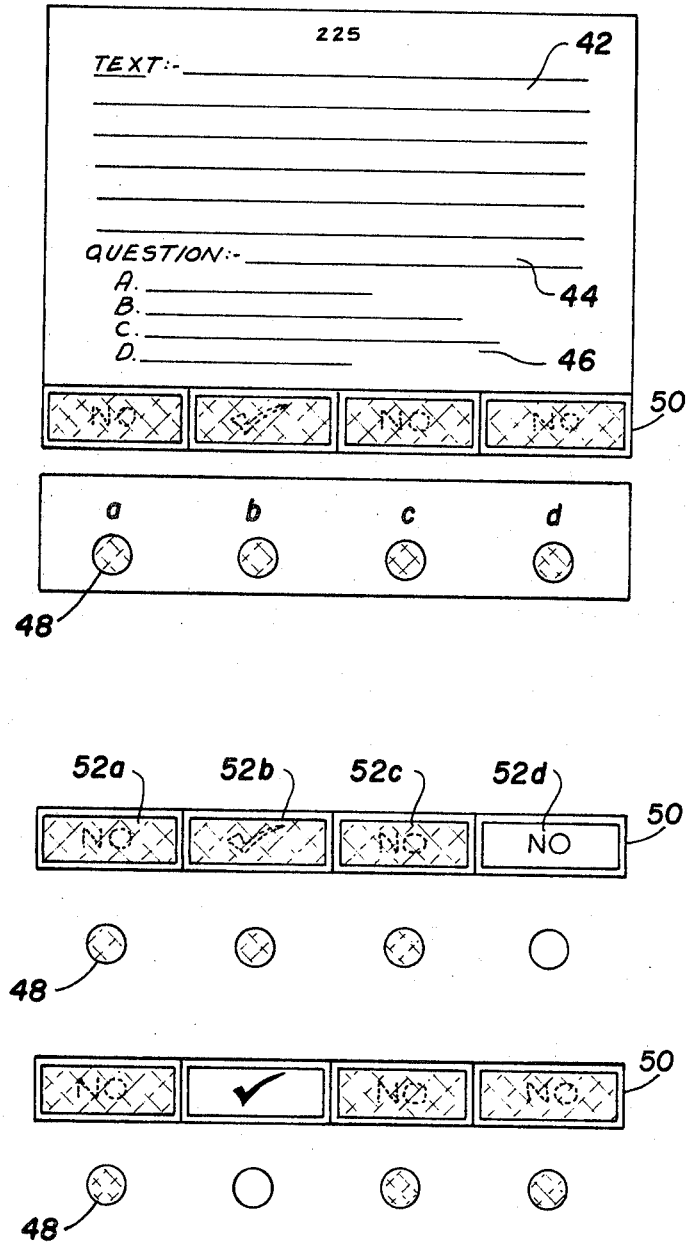
FIG. 5 illustrates the typical information which is reproduced by the device and further illustrates the manner in which the user selects answers to questions which are typically part of the reproduced information.

Reference is now made to FIG. 5 which illustrates the nature of the information contained on the individual frames 40 of the microfilm 20. This information typically includes textual material 42, a question 44 related to the textual material, and multiple answers 46 to the question which tests the user's comprehension of the textual material. When presented with this display, it is contemplated that the user will select an answer by depressing one of four available answer buttons 48A through 48D. The frame 40 of the film strip also contains along its lower edge some indication 50 of whether the choice made is the correct one. These indications are arranged to fit within a series of windows 52 formed by painting, frosting or otherwise blocking out the appropriate portion of the screen 30. Each window is normally covered by a shutter member 54 (FIG. 7) movable to expose the window 52 by the associated button 48 actuable by the user. Manual depression of a button 48 unmasks a corresponding window 52A to 52D which is formed by printing over a portion of the screen 40 and provides the user with an appropriate indication whether the selected answer 50 is correct or not.

Figure 6:
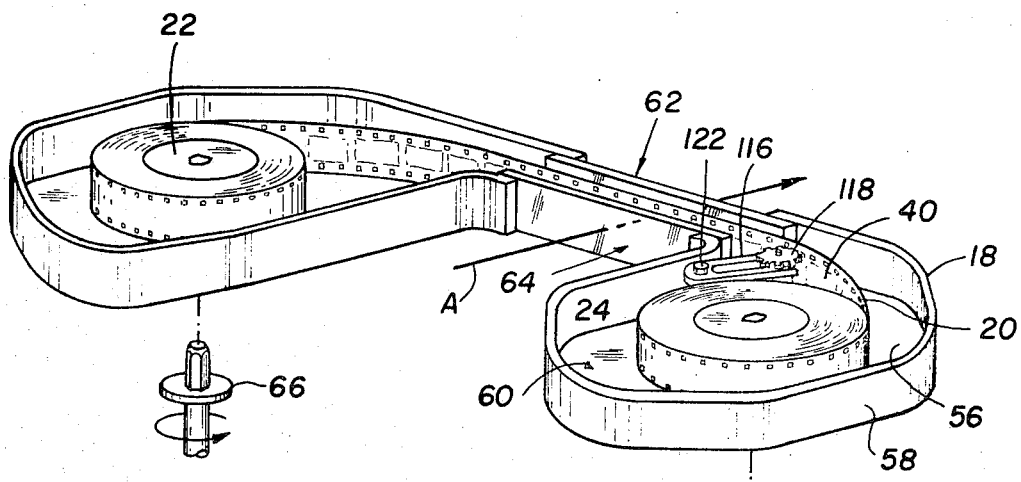
FIG. 6 is a perspective view of a strip of microfilm on which information is stored for use in the device hereof.

Reference is now made to FIG. 6 which illustrates in greater detail the construction of the previously noted cartridge 18 which contains the microfilm 20 and reels 22 and 24.

The cartridge 18 is a unitary construction having flat bottom 56, a top wall (removed) and a vertical wall 58 forming an enclosure. The enclosure approximates the shape of a pair of spaced lobes 60 interconnected by a narrow bridging member 62. In large measure the shape of the cartridge is determined by the base 14, however, it should contain at least two portions 60, each sufficiently large to accommodate the associated reels 22 or 24 when each of which is fully loaded with the strip of microfilm. The narrow bridging member 62 is preferably made of clear plastic, glass or is framed out so as to provide a window 64 through which at least a single frame 40 of the strip is visible. Further, at least the bottom wall 56 of the cartridge is provided with a hole aligned with the center of each of the reels 22 and 24 so that they can be driven by a pair of drive studs 66 and 68. Preferably more than one cartridge will be used during the operation of the present device and consequently the cartridges should be physically alike to permit swift and easy replacement. The information discussed in connection with FIG. 5, namely textual material 42, question 44 and answers 46, will be understood to be contained on each discrete frame 40 reproduced along the length of the microfilm strip 20. Operation of the device, therefore, contemplates the selective movement of each frame 40 into position in front of the window 64 in the bridge 62, along an optical axis A. This is achieved by placing the reels 22 and 24 on the studs 66 and 68 which are powered manually by the user by appropriate manipulation of discs 70 (see FIGS. 1–4) which each have a portion which is accessible to the user through an opening 76 in the front of the device 10.

Returning to FIG. 4, the reels are placed on the studs 66 and 68 with each of which a tape support deck 72 is fixed by a set screw 74 or the like. The discs 70 are secured to freely rotate about the studs 68 and have a diameter sufficient to have them project outwardly through an opening 76 in the front of the base 14. Located below each of the support decks 72 and above the discs 70 is a horizontal pulley 78 which is also freely rotatable about the respective stud. The pulley 78 has an upwardly extending annular portion 80 provided with a ratchet or rack face 82 which engages with a similar or cooperating face 84 on the lower surface of the supporting member, thus providing a single direction clutch which permits proper rotation of each reel in the direction of the arrows in FIG. 6 while preventing unwinding of the film from the reel should they be operated in the other direction. Preferably the ratchet or clutch device should be of the slip type and be oppositely oriented to permit the discs to be turned in the wrong direction (in error) without causing rotation of the supporting deck or unwinding of the film.

The forward upper portion of the cover member 12 is provided with a hinged lid 15 which is liftable as seen in FIG. 4 to permit the cartridge to be easily inserted in place over the studs 66 and 68. Suitable locking fasteners, clips, etc. and a handle complete the cover and base to permit portability.

Figure 7:
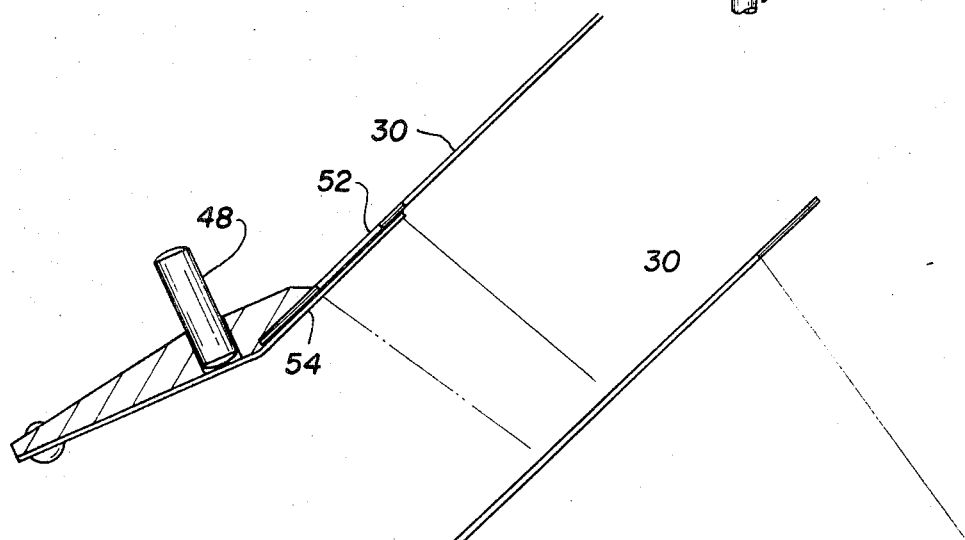
FIG. 7 is an enlarged elevational view illustrating an examplary structure permitting the user to select answers to the reproduced questions.

FIG. 7 illustrates an exemplary method of masking the windows 52A to 52D covering the indications of the correctness of the selected multiple choice answers and then permitting selective display of one of these indications in response to the depression of an answer button. The indications may be yes or no or other checks and expressions. Specifically, as illustrated in FIG. 7, the integral screen 30 has projected thereon the information of FIG. 5, but the lower portion thereof, namely the "yes" or "no" indications are masked as aforementioned from being viewed through the windows 52 by the flat spring-like opaque shutter member 54 secured at its lower end 86. In response to depression of the button 48, the free end of the cooperating shutter member is moved into a clearance position exposing the window 52 to the projected image thereby permitting display of the indication, through the window 52. Upon release of the button 48, the shutter 54 returns to its original position under the urgency of its spring-like nature covering the screen 30 to close the window 52.

Figure 8:
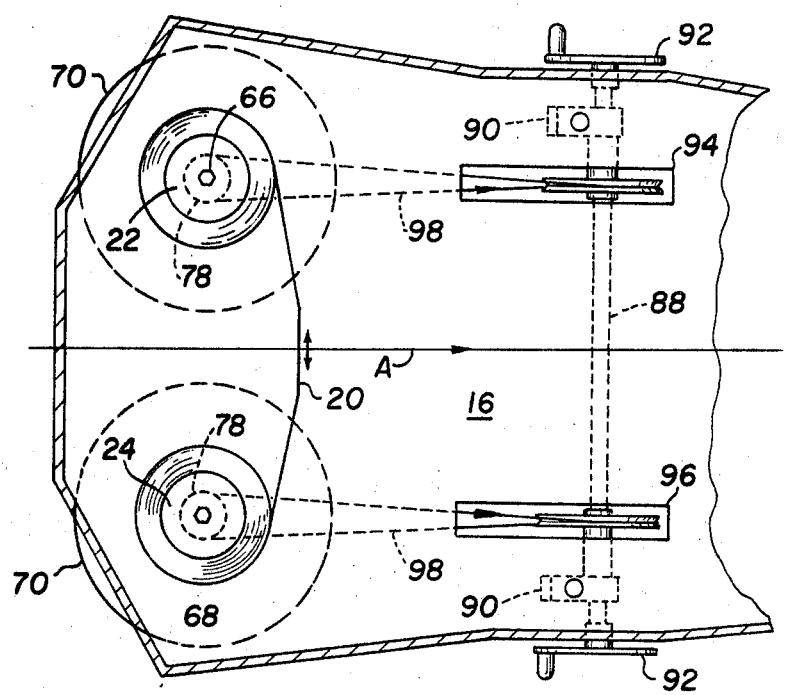
FIGS. 8, 9 are, respectively, plan and side elevational views of a fast-scan manual arrangement for the device hereof.
Figure 9:
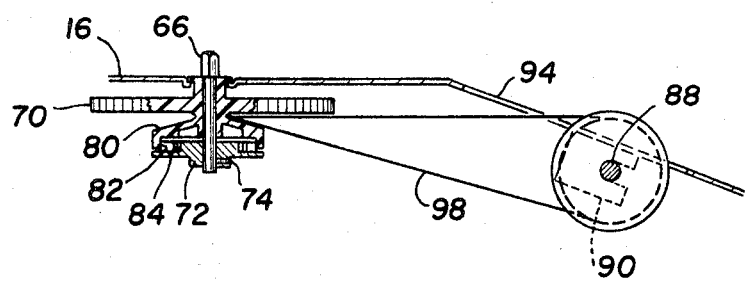

Reference is now made to FIGS. 8 and 9 which illustrate a fast-scan system or arrangement illustrative of that which may be embodied in the device 10 to manually operate the reels 22 and 24 at a faster rate than the discs 70. The illustrated arrangement includes a crank shaft 88 journaled on suitable bearings 90 to the base chassis 16, transversely of the device 10 and having external cranks 92 at opposite ends and vertical pulleys 94 and 96 in general free alignment with depending portions of the previously noted reel-supporting studs 66 and 68 which are also provided with pulleys 72 and 74 respectively. Pulley belts 98 are entrained about the pulleys 94 and 96 as well as about the respective pulleys 78 on the studs 66 and 68 as previously described. Thus, depending upon the direction in which the user wants to fast-scan the microfilm 20, one or the other of the cranks 92 is manually operated. The unidirectional clutch previously described will also be effective here.

Figure 10:
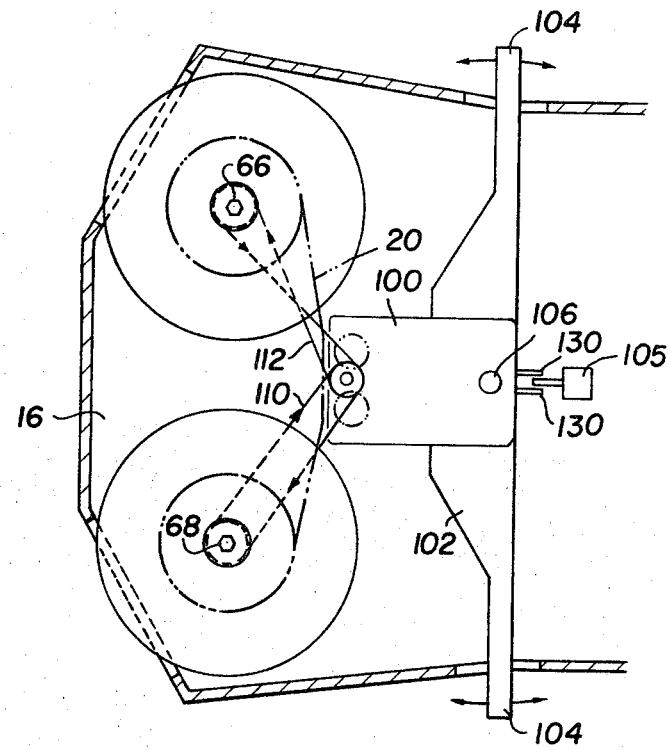
FIG. 10, 11 are, respectively, plan and side elevational views of a fast-scan motorized arrangement for the device hereof.
Figure 11:
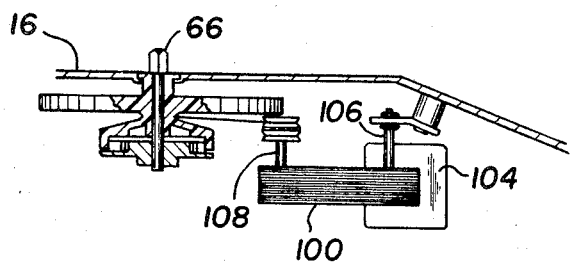

Reference is now made to FIGS. 10 and 11, in which an alternative fast-scan arrangement is illustrated. This arrangement is not operated manually but rather is powered by an appropriate unidirectional electric motor 100. This motor is appropriately supported on a support plate 102 having wings 104 extending laterally from the base 16, pivotally supported by a vertical post 106. At its opposite end the plate 102 has a depending pulley 108 about which are entrained two belts 110 and 112, the latter being crossed, which, at their opposite ends are each further entrained about the previously noted pulleys 78 mounted on the studs 66 and 68 respectively. Thus, movement of pulley 108 about the pivot 106 as by manipulating the wings 104 in one direction tightens belt 110 while simultaneously slackening belt 112 and accordingly provides motorized feed movement in one direction only while pivotal movement in the opposite direction produces the reverse belt tightening and slackening and thus feed movement via belt 112 in the opposite direction.

Extending from the rear of the plate 102 is a forked member 130 between which extends a micro switch 105. On pivoting of the plate 102, the control micro switch is actuated. The switch is connected to a source of power by which the running of the motor is controlled.

Remaining FIG. 12 illustrates a preferred indexing structure for the microfilm 20. Although the film strip 20 has the usual edge perforations 114, it will be seen from the foregoing that the film is not urged through its feed movement using these sprockets. Instead, as has just been described, the film strip 20 is selectively wound on one or the other of the reels 22 and 24 which are manipulated by hand. However, use is made of the sprocket perforations or holes 114 to index the individual frames 40 into position along the optical axis preparatory to projection thereof onto either the integral screen 30 or the external screen 38. This indexing mechanism is located on one or both sides of the bridge portion 62 and adjacent the reels 22 and 24 within the cartridge (FIG. 6). Each indexing mechanism includes a spring 116 having bifurcated arms which extend on opposite sides of a rotative body 118 which itself has opposite flat sides 120. The bifurcated spring 116 is fixed about a vertical pin 122 fixed to the chassis so that it cannot move bodily. The tines of the spring 116 are, however, resiliently separable or distendable. In a well understood manner the flats 120 and spring 116 cooperate with each other to cause a snapping of body 118 into that rotative position which is illustrated in FIG. 12. Mounted on opposite vertical ends of the body 118 are teeth 124 and 126 which engage the sprockets of the film strip. By properly initially indexing the film strip on the sprocket teeth 124 and 126 in relation to the optical axis A, each frame 40 is thereafter provided with its proper position along the optical axis in the at-rest position of the member 118. Any tendency to move from this position is rectified by action of the spring 116 on the body 118. The use of the sprockets, furthermore, stretches the film so that perfect focus can be maintained even though the heat of the machine may tend to warp the film.

Various modifications are possible, namely to the exact location of the cranks, and fast-scan structure, as well as to the exact details of execution. Other forms of one-way slip clutches may be used than the ratchet shown. One sprocket may be used instead of two. When the device is used to merely project microfilm, the windows 52 and the shutters can be completely eliminated. The mirror may also be removed if only external projection is to be used. The film may have the indications or textual material arranged vertically or horizontally in the frame. Other variations will be obvious to those skilled in this art. Accordingly the present disclosure is to be taken as illustrative only.

What is claimed:

1. A viewer for projecting an image of information stored on a strip of film or the like, comprising a body having a screen and optical means arranged to project on said screen, said strip being located in a cartridge and wound at least in part about two spaced reels between which a portion of the strip corresponding to the image to be projected is exposed, means for mounting said cartridge on a pair of rotatable studs adapted to respectively engage said reels and to maintain said exposed portion of said strip operatively related to said optical means, means for selectively rotating each of said studs to move said strip past said optical means to cause projection of selected images of said strip on said screen, and a plurality of means for blocking selected portions of said projected image from said screen, each of said last named means comprising a flat spring mounted contiguous with said screen, and a button manually displaceable in said body into engagement with said spring to separate said spring from said screen.

2. The viewer according to claim 1 including a mirror interposed between said optical means and said screen to reflect said image on said screen.

3. The viewer according to claim 2 including a second screen external of said body, and wherein said body has a light aperture aligned between said optical means and said second screen, said mirror being removable to permit the projection of light directly on said second screen.

4. The viewer according to claim 3 wherein said mirror is hinged along one edge to be removable from the path of projection of light.

5. A viewer for projecting an image of information stored on a strip of film or the like, comprising a body having a screen and optical means arranged to project on said screen, said strip being located in a cartridge and wound at least in part about two spaced reels between which a portion of the strip corresponding to the image to be projected is exposed, means for mounting said cartridge on a pair of rotatable studs adapted to respectively engage said reels and to maintain said exposed portion of said strip operatively related to said optical means, means for selectively rotating each of said studs to move said strip past said optical means to cause projection of selected images of said strip on said screen including a unidirectional slip clutch imposed between the means for rotating the stud and said stud, said means for rotating each of said studs comprises a fixed pulley freely secured to said stud and engaging said clutch, a second pulley remote from said first pulley having an enlarged diameter, and means connecting said pulley and means for rotating said second pulley whereby said stud may be rotated at increased speed.

6. The viewer according to claim 5 including means accessible from the exterior of said body and connected to said studs for rotating said studs.

7. The viewer according to claim 5 including a crank located on the exterior of said body and connected to said second pulley whereby said pulleys may be manually rotated.

8. The viewer according to claim 5 including a motor attached to said second pulley and means for controlling said motor.

9. The viewer according to claim 5 wherein said means for rotating each of said studs comprises a first pulley attached to each of said studs and a motor and a single second pulley connected to the output shaft of said motor, said motor being pivoted about an axis parallel to the output shaft thereof, belt means connecting said second pulley to each of said first pulleys whereby pivoting of said motor which cause tightening of one belt and slackening of the other belt to provide selective rotation of said studs.

10. A viewer for projecting an image of information stored on a strip of film or the like, comprising a body having a screen and optical means arranged to project on said screen, said strip being located in a cartridge and wound at least in part about two spaced reels between which a portion of the strip corresponding to the image to be projected is exposed, said cartridge including a closed bridging member between said spaced reels, said bridging member supporting said reels in spaced condition and having a transparent window providing a light opening to expose said strip, means for mounting said cartridge on a pair of rotatable studs, adapted to respectively engage said reels and to maintain said exposed portion of said strip operatively related to said optical means and means for selectively rotating each of said studs to move said strip past said optical means to cause projection of selected images of said strip on said screen.

11. A viewer for projecting an image of information stored on a strip of film or the like, said strip having a plurality of discrete frames each containing a predetermined image and sprocket holes along at least one edge thereof, comprising a body having a screen and optical means arranged to project on said screen, said strip being located in a cartridge and wound at least in part about two spaced reels between which a portion of the strip corresponding to the image to be projected is exposed, means for mounting said cartridge on a pair of rotatable studs adapted to respectively engage said reels and to maintain said exposed portion of said strip operatively related to said optical means, means for selectively rotating each of said studs to wind said strip thereabout and means engaging said sprocket holes for indexing said film at selected distances in alignment with optical means to cause projection of selected images of said strip on said screen.

12. The viewer according to claim 11 wherein said indexing means comprises a sprocket wheel adapted to enter into said sprocket holes, said wheel being mounted on a central rotatable shaft having a flat land portion, and including means adapted to resiliently abut said shaft and engage said land portion.

\* \* \* \* \*